US011503309B2

(12) United States Patent
Leleannec et al.

(10) Patent No.: US 11,503,309 B2
(45) Date of Patent: Nov. 15, 2022

(54) METHOD AND APPARATUS FOR VIDEO ENCODING AND DECODING BASED ON ADAPTIVE COEFFICIENT GROUP

(71) Applicant: InterDigital VC Holdings, Inc., Wilmington, DE (US)

(72) Inventors: Fabrice Leleannec, Mouaze (FR); Tangi Poirier, Thorigne-Fouillard (FR); Ya Chen, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/255,663

(22) PCT Filed: Jun. 28, 2019

(86) PCT No.: PCT/US2019/039694
§ 371 (c)(1),
(2) Date: Dec. 23, 2020

(87) PCT Pub. No.: WO2020/006338
PCT Pub. Date: Jan. 2, 2020

(65) Prior Publication Data
US 2021/0274196 A1    Sep. 2, 2021

(30) Foreign Application Priority Data

Jun. 29, 2018    (EP) ..................................... 18305835
Jul. 9, 2018     (EP) ..................................... 18305901

(51) Int. Cl.
*H04N 19/18*    (2014.01)
*H04N 19/14*    (2014.01)
(Continued)

(52) U.S. Cl.
CPC ............. *H04N 19/18* (2014.11); *H04N 19/14* (2014.11); *H04N 19/147* (2014.11); *H04N 19/176* (2014.11); *H04N 19/70* (2014.11)

(58) Field of Classification Search
CPC ...... H04N 19/18; H04N 19/14; H04N 19/147; H04N 19/176; H04N 19/70
See application file for complete search history.

(56) References Cited

U.S. PATENT DOCUMENTS

2021/0211729 A1*    7/2021    Koo ..................... H04N 19/132

FOREIGN PATENT DOCUMENTS

AU    2012326895 A1 *    5/2014    ........... H04N 19/103
EP         2637405 A1 *    9/2013    ............ H03M 7/4006
(Continued)

OTHER PUBLICATIONS

Sole et al "Transform Coefficient Coding in HEVC", 1051-8215 © 2012 IEEE (Year: 2012).*

(Continued)

*Primary Examiner* — Dramos Kalapodas
(74) *Attorney, Agent, or Firm* — Condo Roccia Koptiw LLP

(57) ABSTRACT

Various implementations for video encoding and decoding are presented involving determining, for a block being encoded or decoded in a picture, a coefficient group mode for coding at least one coefficient of a set of transform coefficients of the image block; encoding or decoding the set of transform coefficients of the image block responsive to the coefficient group mode. The coefficient group mode can be determined from at least one of image block size, number of non-zero transform coefficients inside the image block, position of a transform coefficient inside the image block, decoded syntax element, wherein the coefficient group mode can specify whether a coefficient group significance flag is (Continued)

Figure 1:
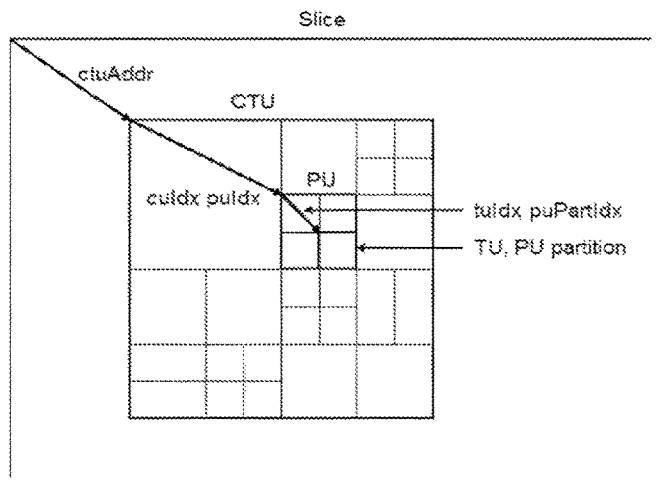

coded/decoded, indicating that at least one coefficient is non-zero inside a coefficient group and/or specify at least one size of the coefficient group.

20 Claims, 11 Drawing Sheets

(51) Int. Cl.
*H04N 19/147* (2014.01)
*H04N 19/176* (2014.01)
*H04N 19/70* (2014.01)

(56) References Cited

FOREIGN PATENT DOCUMENTS

| | | | | |
|---|---|---|---|---|
| EP | 2637405 | A1 | 9/2013 | |
| EP | 3361730 | A1 * | 8/2018 | ........... H04N 19/105 |
| EP | 3723373 | A1 * | 10/2020 | ............. H04N 19/11 |
| WO | WO-2016206590 | A1 * | 12/2016 | ........... H04N 19/119 |
| WO | WO 2016208590 | A1 | 12/2016 | |

OTHER PUBLICATIONS

Joel Sole et al., "Transform Coefficient Coding in HEVC", 1051-8215 © 2012 IEEE (Year: 2012).*

Sole et al., "Transform Coefficient Coding in HEVC", IEEE Transactions on Circuits and Systems for Video Technology, Institute of Electrical and Electronics Engineers, vol. 22, No. 12, Dec. 2012, pp. 1765-1777.

Akula et al., "Description of SDR, HDR and 360° video coding technology proposal considering mobile application scenario by Samsung, Huawei, GoPro, and HiSilicon", Joint Video Exploration Team (JVET) of ITU-T SG 16 WP 3 and ISO/IEC JTC 1/SC 29/WG 11, Document JVET-J0024_v2, 10th Meeting: San Diego, USA, Apr. 10, 2018, 22 pages.

Anonymous, "High Efficiency Video Coding", International Telecommunications Union (ITU), Series H: Audiovisual and Multimedia Systems Infrastructure of audiovisual services—Coding of moving video, International Telecommunications Union Standardization Sector, Recommendation ITU-T H.265, Oct. 2014, 540 pages.

Chen et al., "Algorithm Description of Joint Exploration Test Model 3", Joint Video Exploration Team (JVET) of ITU-T SG16 WP3 and ISO/IEC JTC1/SC29/WG11, Document: JVET-C1001 v3, 3rd Meeting, Geneva, Switzerland, May 26, 2016, 37 pages.

* cited by examiner

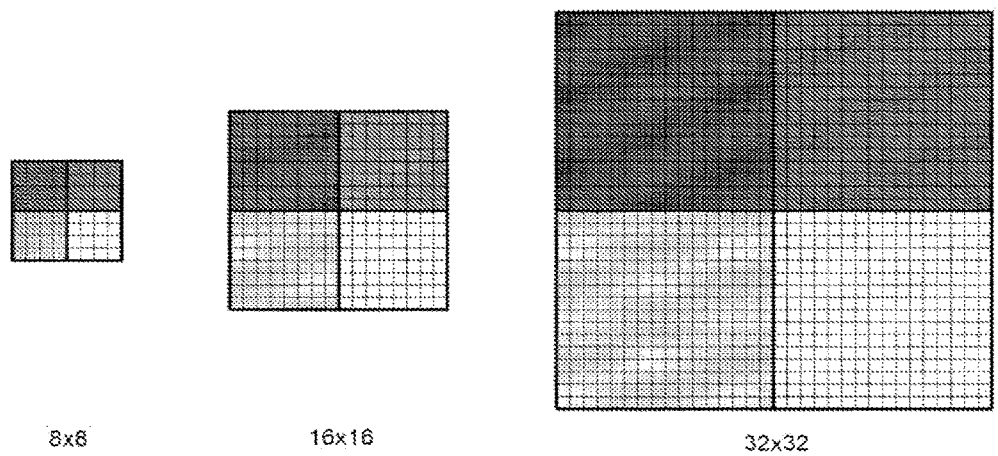
Figure 8
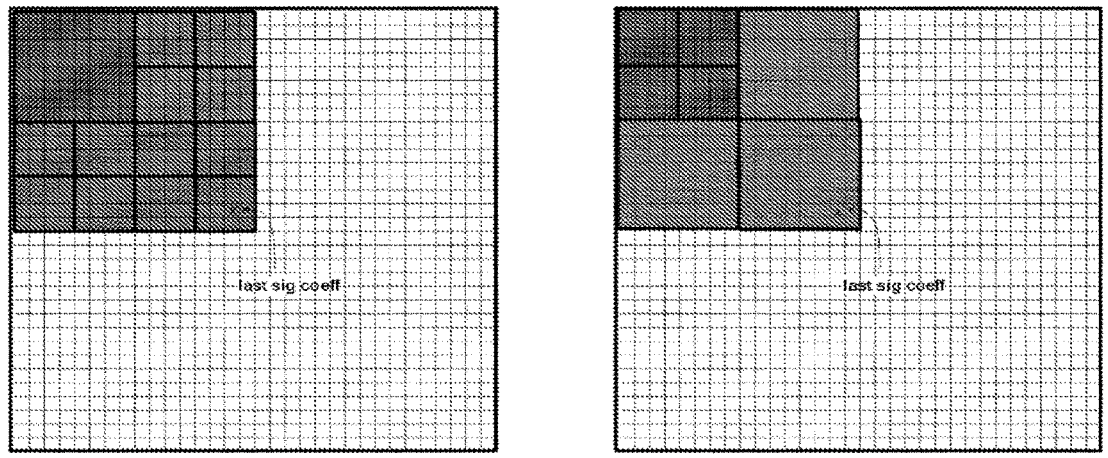
Figure 9(a)
$Size_{CG\_Lowfreq} = 8, Size_{CG\_Highfreq} = 4$
Figure 9(b)
$Size_{CG\_Lowfreq} = 4, Size_{CG\_Highfreq} = 8$

METHOD AND APPARATUS FOR VIDEO ENCODING AND DECODING BASED ON ADAPTIVE COEFFICIENT GROUP

This application claims the benefit, under 35 U.S.C. § 371 of International Application PCT/US2019/039694, filed Jun. 28, 2019 which was published in accordance with PCT Article 21(2) on Jan. 2, 2020, in English, and which claims the benefit of European Patent Application No. 18305835.3, filed Jun. 29, 2018 and European Patent Application No. 18305901.3, filed Jul. 9, 2018.

1. TECHNICAL FIELD

A method and an apparatus for coding a video into a bitstream are disclosed. Corresponding decoding method and apparatus are further disclosed.

2. BACKGROUND ART

In the field of video compression, compression efficiency is always a challenging task.

In existing video coding standards, pictures to be coded are divided into regular square blocks or units. Prediction, transformation of error residues and quantization are commonly performed on such square units. Quantized transform coefficients are then entropy coded to further reduce the bitrate. When it comes to the coding stage of the quantized transform coefficients, several schemes have been proposed wherein parsing of the coefficients in the square unit plays an important role for optimizing the coding syntax and the information to encode for reconstructing the coefficients.

With the emergence of new video coding schemes, the units used for encoding may not be always a square unit and rectangular units may be used for prediction and transformation. It appears that the classical parsing schemes defined for square units may no more be appropriate in the case where rectangular units are used.

Therefore there is a need for a new method for coding and decoding a video.

3. SUMMARY

According to an aspect of the present disclosure, a method for coding a video is disclosed. Such a method comprises determining a coefficient group mode for coding at least one coefficient of a set of transform coefficients of the image block; encoding the set of transform coefficients of the image block the responsive to the coefficient group mode. The coefficient group mode is determined from at least one of a size of the image block, a number of non-zero transform coefficients inside the image block, a position of a transform coefficient inside the image block. The coefficient group mode specifies whether a coefficient group significance flag is coded or/and specifies a size of the coefficient group.

According to another aspect of the present disclosure, an apparatus for coding a video is disclosed. Such an apparatus comprises means for determining a coefficient group mode for coding at least one coefficient of a set of transform coefficients of the image block from at least one of a size of the image block, a number of non-zero transform coefficients inside the image block, a position of a transform coefficient inside the image block; means for encoding the set of transform coefficients of the image block the responsive to the coefficient group mode.

According to an aspect of the present disclosure, an apparatus for coding a video is provided, the apparatus including a processor, and at least one memory coupled to the processor, the processor being configured to determine a coefficient group mode for coding at least one coefficient of a set of transform coefficients of the image block from at least one of a size of the image block, a number of non-zero transform coefficients inside the image block, a position of a transform coefficient inside the image block; and to encode the set of transform coefficients of the image block the responsive to the coefficient group mode According to another aspect of the present disclosure, a method for decoding a video is disclosed. Such a method comprises determining a coefficient group mode for decoding at least one coefficient of a set of transform coefficients of the image block; decoding the set of transform coefficients responsive to the coefficient group mode. The coefficient group mode is determined from at least one of a size of the image block, a decoded syntax element, a position of a transform coefficient inside the image block.

According to another aspect of the present disclosure, an apparatus for decoding a video is disclosed. Such an apparatus comprises means for determining a coefficient group mode for decoding at least one coefficient of a set of transform coefficients of the image block from at least one of a size of the image block, a decoded syntax element, a position of a transform coefficient inside the image block; decoding the set of transform coefficients responsive to the coefficient group mode.

According to an aspect of the present disclosure, an apparatus for decoding a video is provided, the apparatus including a processor, and at least one memory coupled to the processor, the processor being configured to determine a coefficient group mode for decoding at least one coefficient of a set of transform coefficients of the image block from at least one of a size of the image block, a decoded syntax element, a position of a transform coefficient inside the image block; decoding the set of transform coefficients responsive to the coefficient group mode.

The present disclosure also concerns a computer program comprising software code instructions for performing the method for coding or decoding a video according to any one of the embodiments disclosed below, when the computer program is executed by a processor.

The present disclosure also provide a signal comprising video generated according to the method or the apparatus of any of the preceding descriptions. The present disclosure also provides a computer readable storage medium having stored thereon a bitstream generated according to the methods described above. The present disclosure also provide a method and apparatus for transmitting the bitstream generated according to the methods described above. The present embodiments also provide a computer program product including instructions for performing any of the methods described.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

Additional features and advantages of the present disclosure will be made apparent from the following detailed description of illustrative embodiments which proceeds with reference to the accompanying FIGS.

4. BRIEF DESCRIPTION OF THE DRAWINGS

Figure 2:
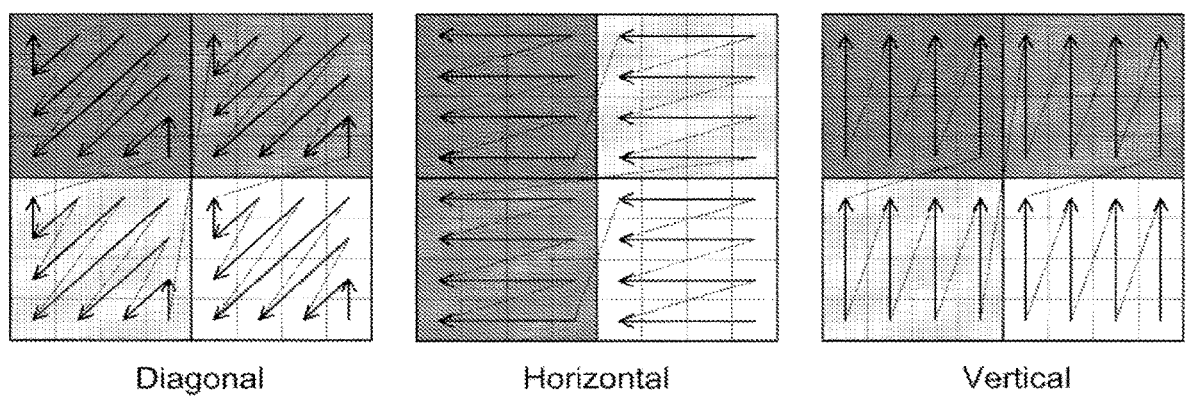
Figure 3A:
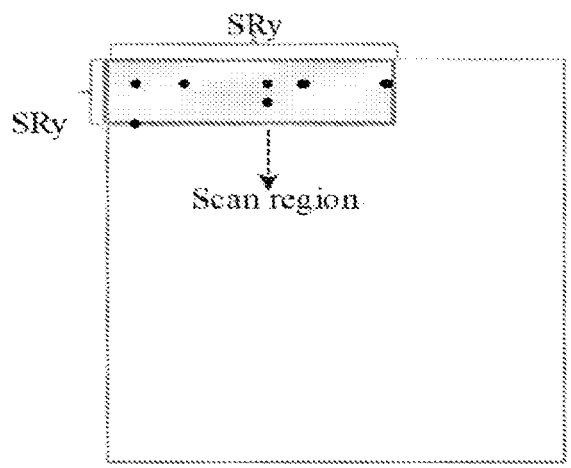
Figure 3B:
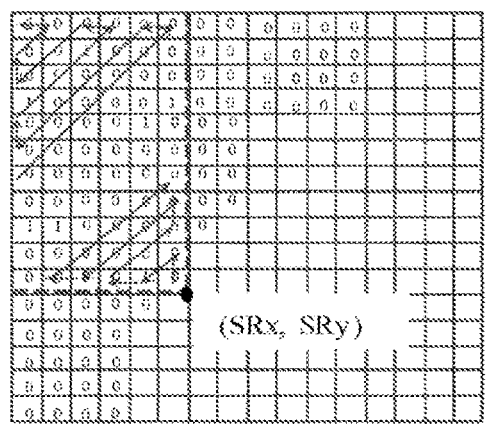
Figure 4:
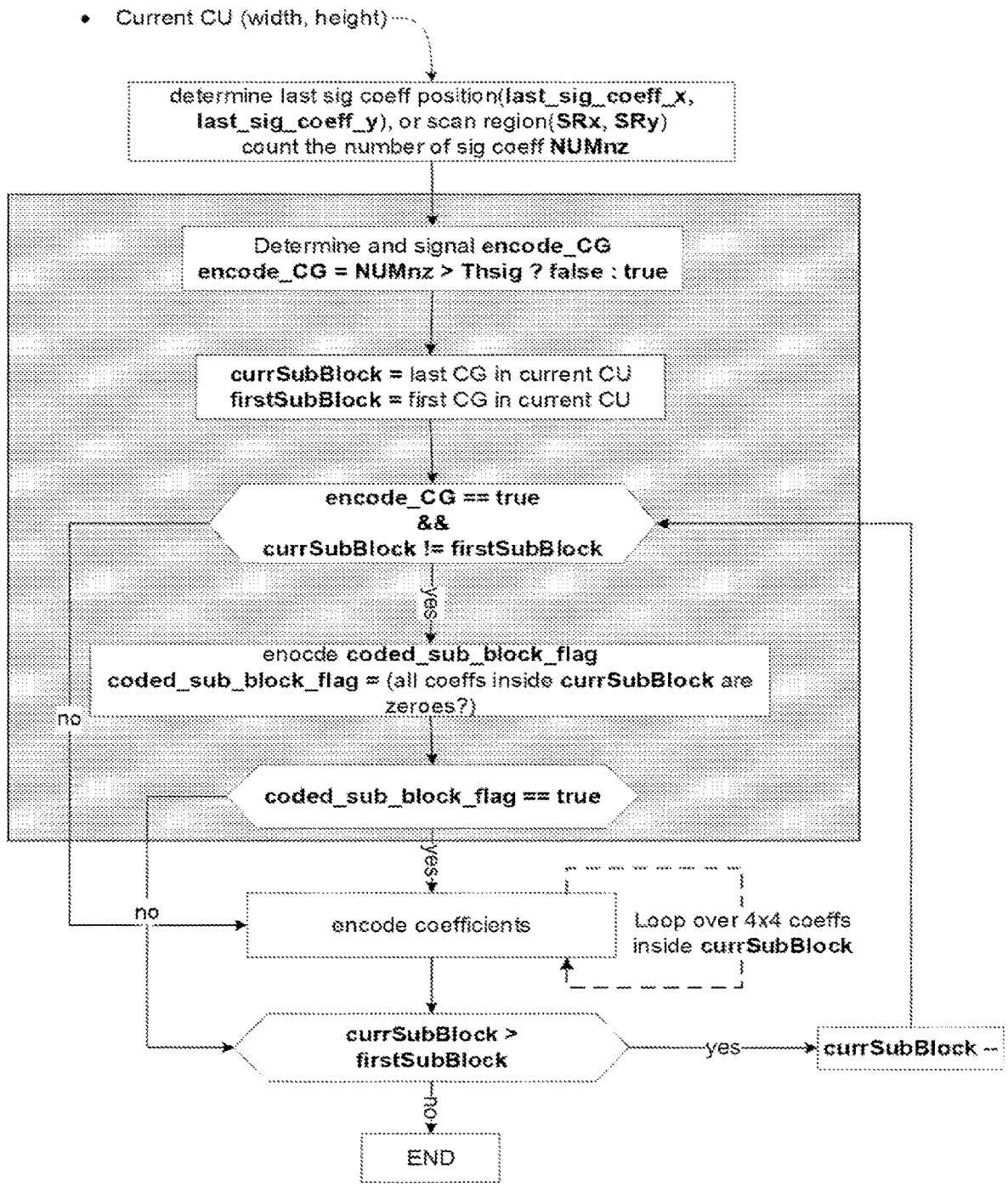
Figure 5:
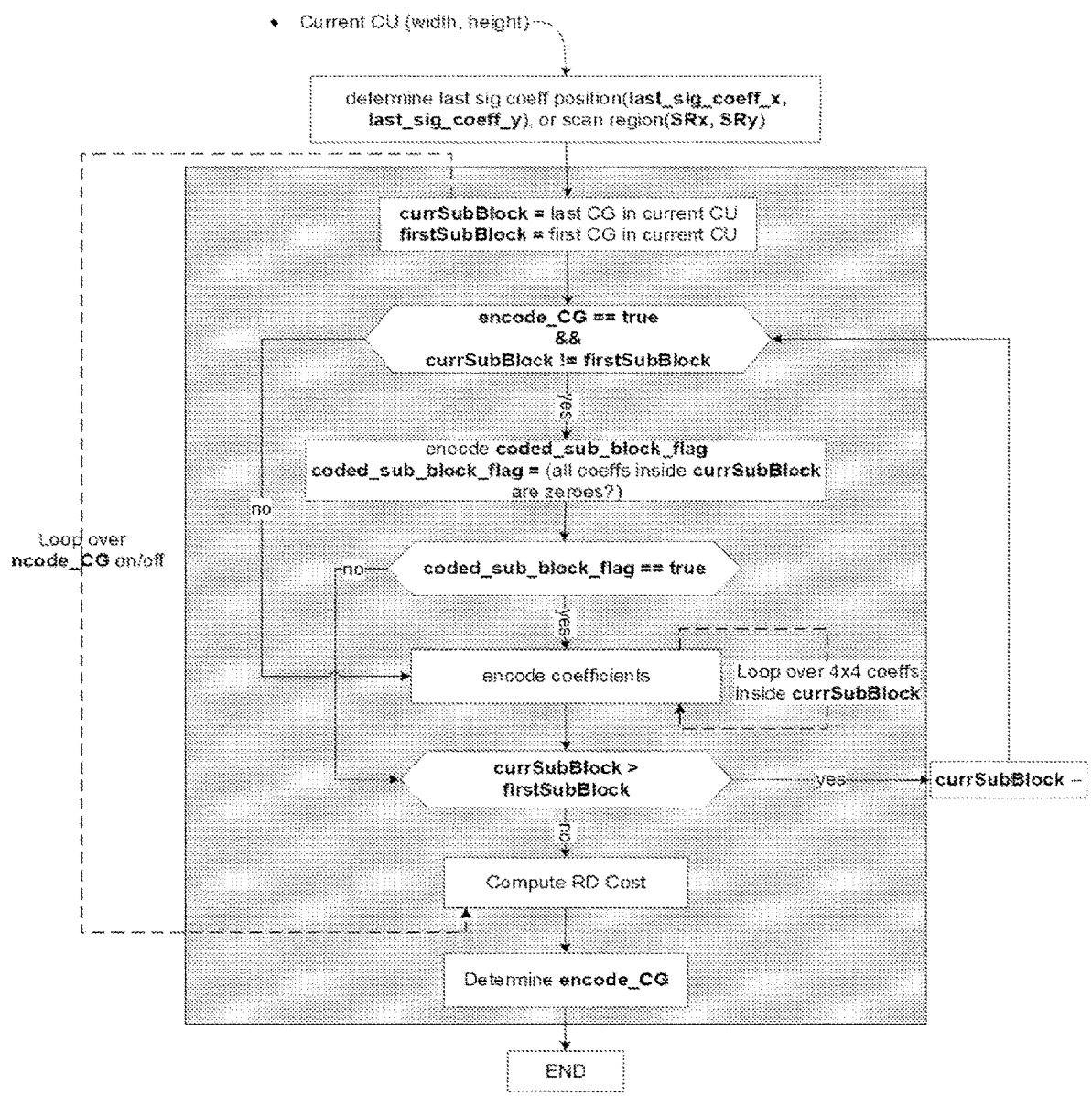
Figure 6:
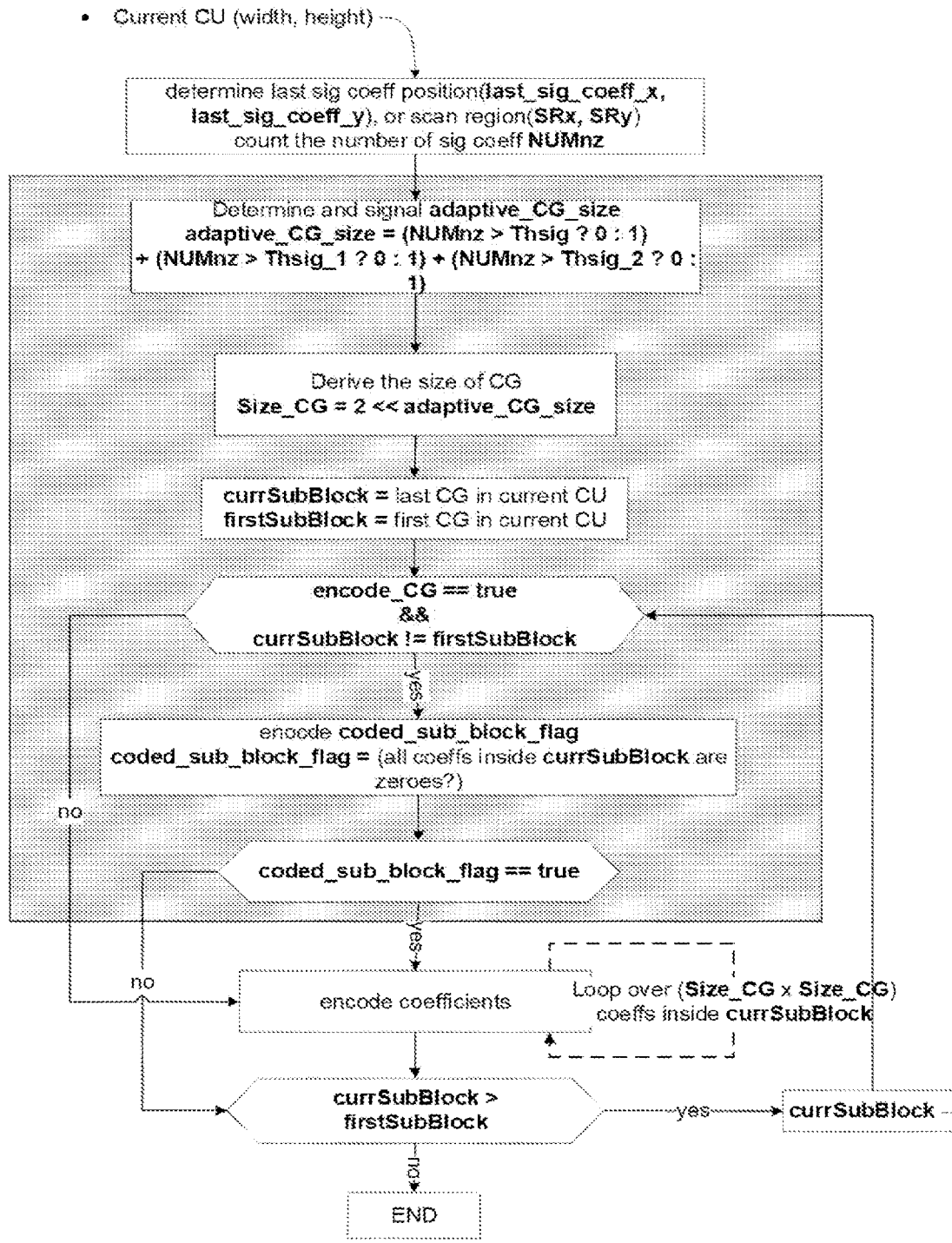
Figure 7:
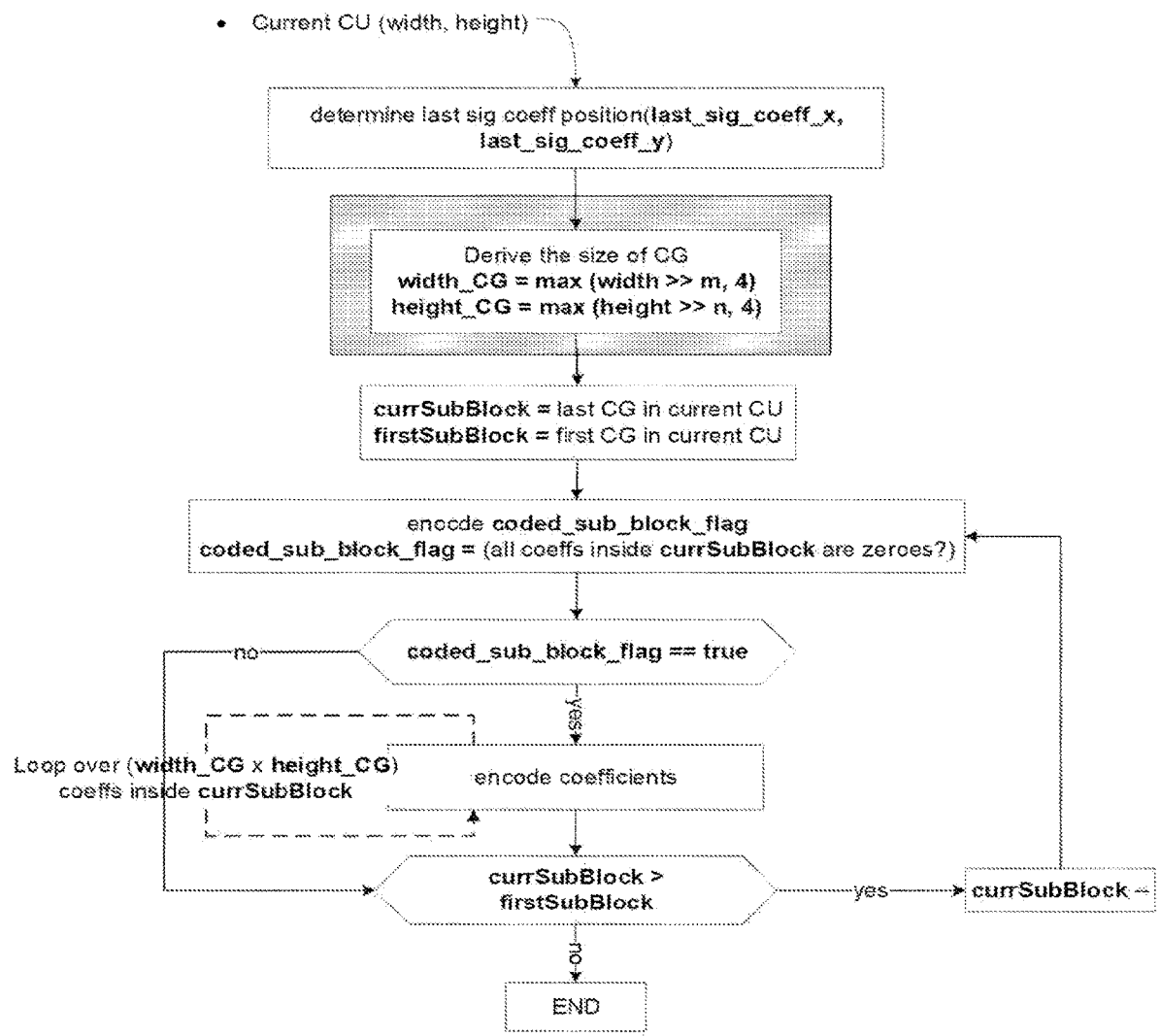
Figure 10:
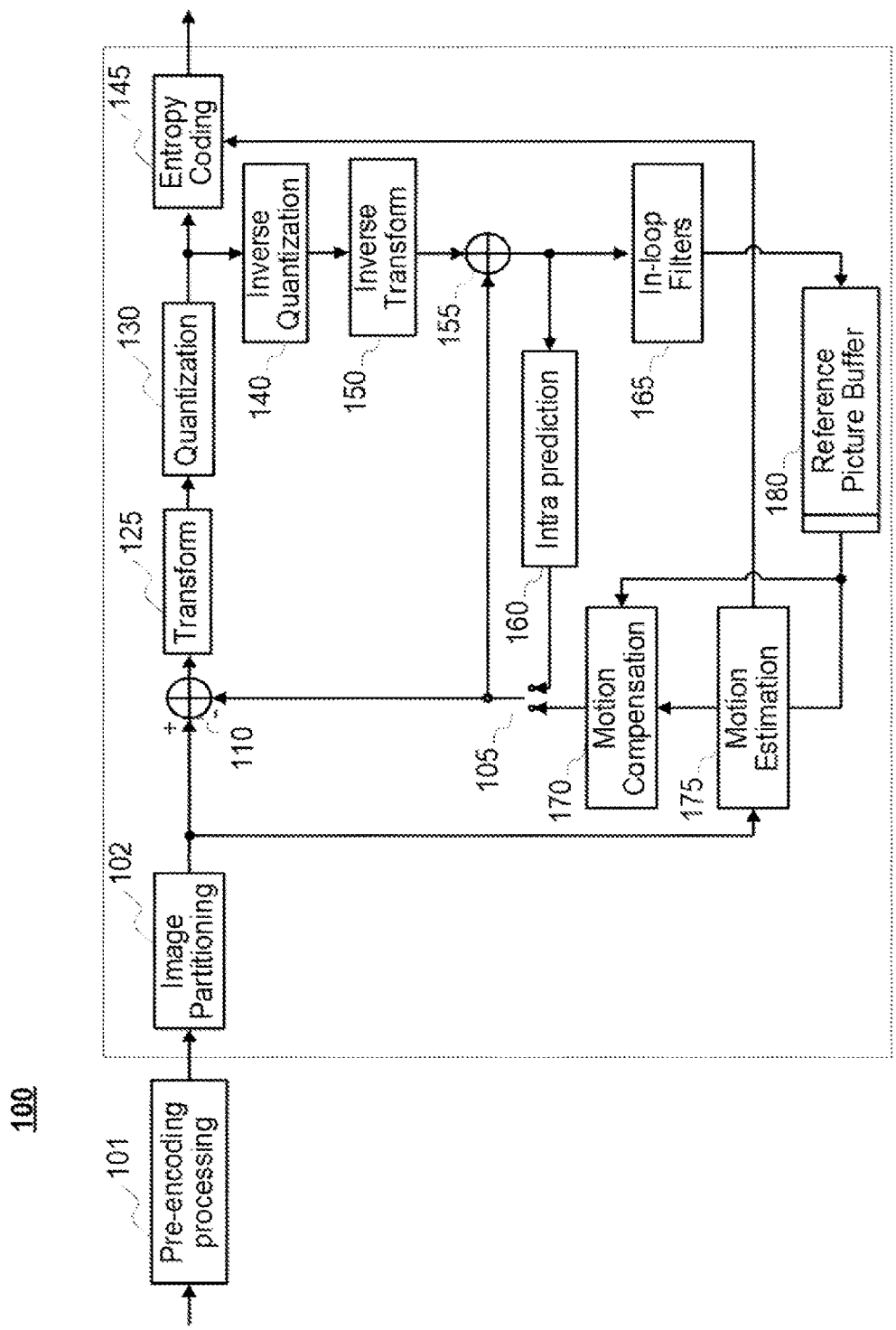
Figure 11:
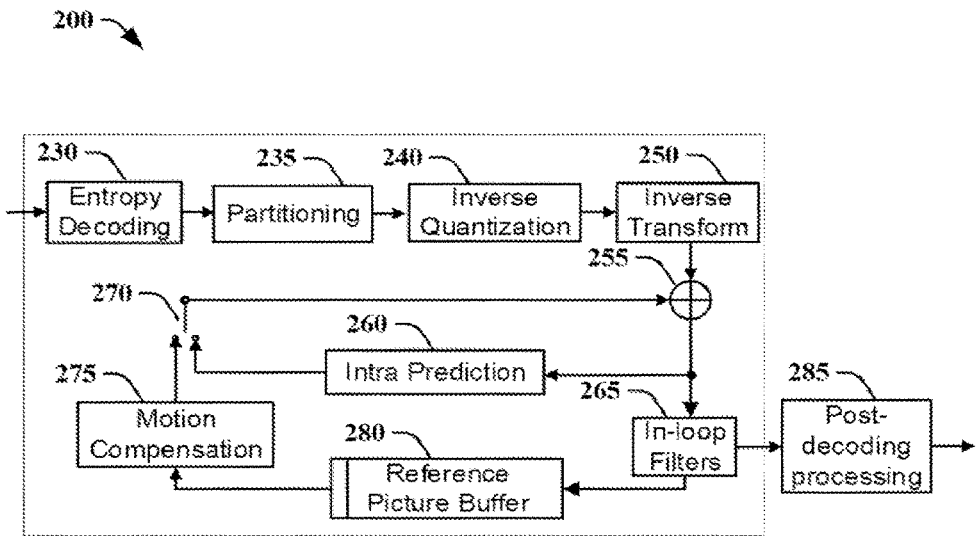
Figure 12:
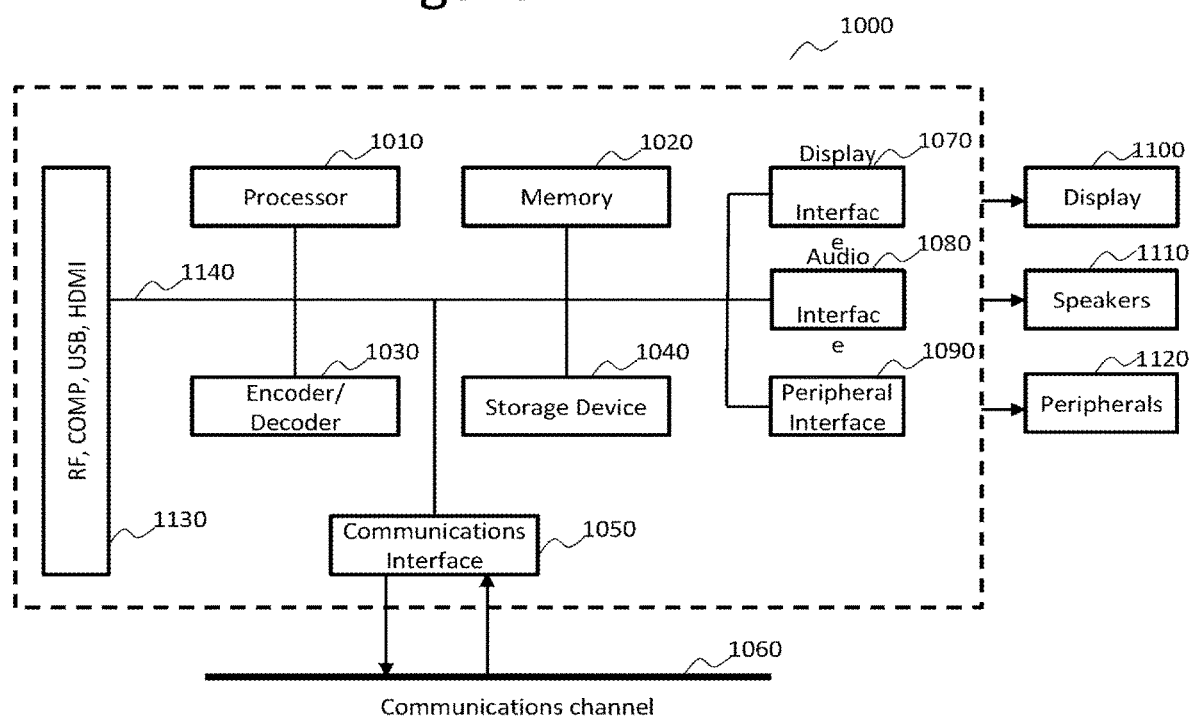
Figure 13:
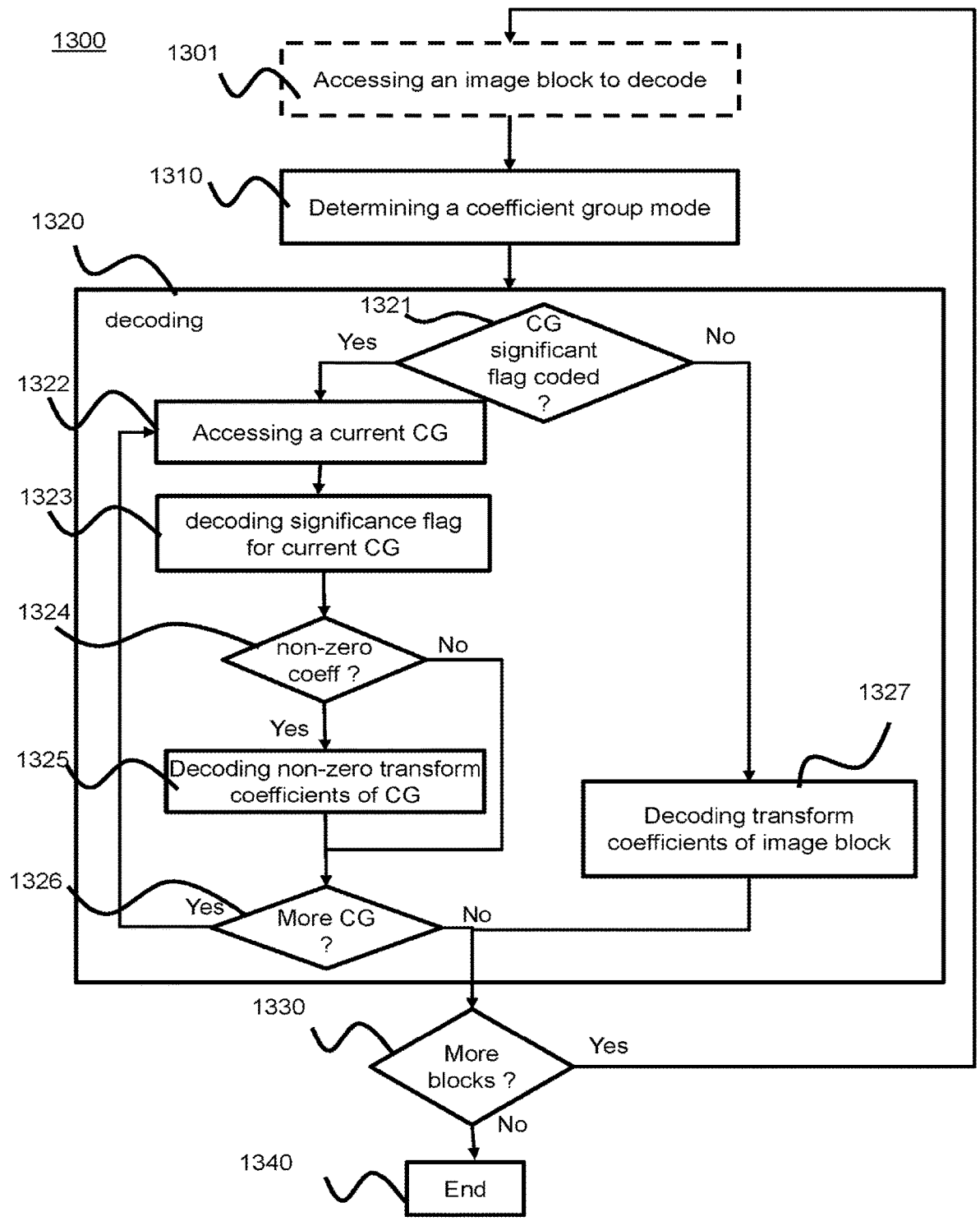
Figure 14:
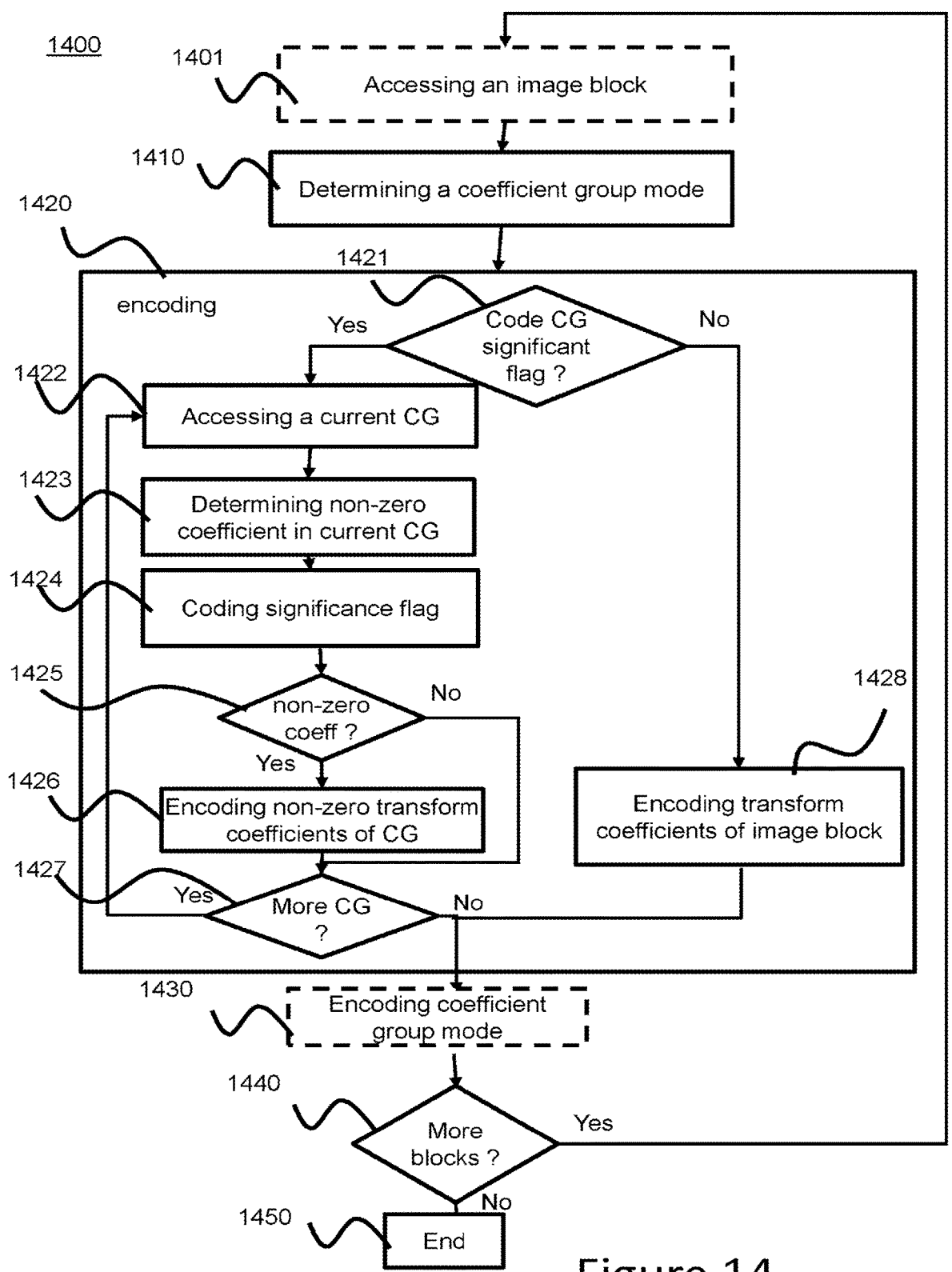

FIG. 1 illustrates a Coding Tree Units and and Coding Tree used for representing a coded picture according to the HEVC standard, FIG. 2 illustrates scanning orders supported by the HEVC standard in an 8×8 Coding Block, FIG. 3(a) illustrates a scan region, FIG. 3(b) illustrates an example of scan order in a scan region, FIG. 4 illustrates a coding method according to a first variant of a first embodiment of the present disclosure, FIG. 5 illustrates a coding method according to another variant of a first embodiment of the present disclosure, FIG. 6 illustrates a coding method according to a variant of the second embodiment of the present disclosure, FIG. 7 illustrates a coding method according to a variant of the third embodiment of the present disclosure, FIG. 8 illustrates adapting CG size for different coding block size according to a third embodiment of the present disclosure, FIGS. 9(a) and 9(b) illustrate an example applying several adaptive sizes for a 32×32 coding block according to variants of a fourth embodiment of the present disclosure, FIG. 10 illustrates an exemplary encoder according to an embodiment of the present disclosure, FIG. 11 illustrates an exemplary decoder according to an embodiment of the present disclosure, FIG. 12 illustrates a block diagram of an example of a system in which various aspects and embodiments are implemented, FIG. 13 illustrates a decoding method according to an embodiment of the present disclosure, FIG. 14 illustrates a coding method according to an embodiment of the present disclosure.

5. DESCRIPTION OF EMBODIMENTS

The technical field of one or more implementations is generally related to video compression. At least some embodiments further relate to improving compression efficiency compared to existing video compression systems. At least one embodiment proposes adaptive coefficient group and adaptive coefficient group sizes for transform coefficient coding.

In the HEVC video compression standard, a picture is divided into so-called Coding Tree Units (CTU), which size is typically 64×64, 128×128, or 256×256 pixels. Each CTU is represented by a Coding Unit (CU) in the compressed domain. Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level as shown on FIG. 1.

After the splitting, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

In HEVC, the quantized transform coefficients of a coding block are coded using non-overlapped coefficient groups (CGs), and each CG contains the coefficients of a 4×4 block of a coding block. As an example, the CGs contained in an 8×8 block are illustrated on FIG. 2. The CGs inside a coding block, and the 16 transform coefficients within a CG, are scanned and coded according to a scan pattern selected among three pre-defined scan orders: diagonal, horizontal, vertical. For inter blocks, the diagonal scanning on the left of FIG. 2 is always used, while for 4×4 and 8×8 intra block, the scanning order depends on the Intra Prediction mode active for that block.

At the decoder side, the overall block parsing process includes the following steps:

1. Decode the Last Significant Coordinate represented by the following syntax elements: last_sig_coeff_x_prefix, last_sig_coeff_y_prefix, last_sig_coeff_x_suffix, and last_sig_coeff_y_suffix. This provides the decoder with the spatial position (x- and y-coordinates) of the last non-zero coefficients in the whole block.

Then for each successive CG from the CG containing the last significant coefficient in the coding block to the top-left CG in the coding block, the following steps apply:

2. Decode the CG significance flag, which is called coded_sub_block_flag in the HEVC specification. This indicates at least one coefficient is non-zero inside the CG.

3. Decode the significant-coefficient flag for each coefficient in the considered CG. This corresponds to the syntax element sig_coeff_flag in the HEVC spec. This indicates which coefficient is non-zero in the CG.

Next parsing stages aim at the coefficient levels, for coefficients known as non-zero in the considered CG. They involve the following syntax elements:

4. coeff_abs_level_greater1_flag: this flag indicates if the current coefficient's absolute value is higher than 1 or not. If not, the absolute value is equal to 1.

5. coeff_abs_level_greater2_flag: this flag indicates if the current coefficient's absolute value is higher than 2 or not. If not, the absolute value is equal to 2.

6. coeff_sign_flag: this indicates the sign of the non-zero coefficients (0: positive, 1: negative).

7. coeff_abs_level_remaining: this indicates the absolute value of the coefficient higher than 2 in absolute value.

All scan passes are decoded for a given CG until all the quantized coefficients in that CG can be reconstructed, before processing the next CG.

The benefit of using CG is to skip coding the transform coefficients which are all zeroes in some frequency areas. By setting the coded_sub_block_flag to 0, which indicates all coefficients inside this CG are zeroes, bits can be saved, and the coding process can be speeded up. However, if most of the transform coefficients inside the coding block are non-zero, it's costly to code one additional coded_sub_block_flag for each 4×4 CG because the value of most flags is 1. Therefore, at least one embodiment proposes the adaption of using CG and the CG size. Advantageously, the at least one embodiment efficiently adapts the CG and the CG size in a way that provides good compression efficiency (rate distortion performance) together with a minimum complexity increase of the coding design.

Indeed, using CG as for example in HEVC or JVET can save the coding bits and also the coding time for some frequency areas which only contain the non-significant transform coefficients. While applying the fixed 4×4 CG size might not be optimal when most of the transform coefficients are significant. Especially the larger resolution videos (4k, 8k and so on) are demanded more and more, the number of larger coding block sizes is relatively increased, which indicates a lot of coded_sub_block_flags need to be signaled if the CG size is fixed as 4×4 in the prior-art.

In the document "Description of SDR, HDR and 360° video coding technology proposal considering mobile application scenario by Samsung, Huawei, GoPro, and HiSilicon" (Document JVET-J0024 by E. Alshina et al., 10th Meeting: San Diego, US, 10-20 Apr. 2018), a region to be scanned in a coding block is determined by the scan region information (SRx, SRy), where SRx is most right non-zero coefficients' x-axis and SRy is most bottom non-zero coefficients' y-axis as depicted in FIG. 3(*a*). Only coefficients in scan region are coded from the right-bottom corner of the scan region in inverse zigzag scan order as shown in FIG. 3(*b*). Accordingly, there is no coded_sub_block_flag to be signaled. However, if most of the transform coefficients inside the scan region are zeroes, it will also remain costly to code these zero coefficients.

Accordingly, a general aspect of at least one embodiment aims to improve the coding efficiency by adapting CG. This section describes at least one implementation in detail. In the following, several embodiments that adapt the CG and the CG size to different conditions and parameters are described. It is organized as follows. First, a general embodiment for decoding comprising adapting one of the coefficient group CG and the coefficient group CG size used in transform coefficients decoding are described. Second, a general embodiment for coding comprising adapting one of the coefficient group CG and the coefficient group CG size used in transform coefficients encoding are described Thirdly, various implementations of a first embodiment comprising adapting the coefficient group CG and the coefficient group CG size used in transform coefficients coding to the number of significant coefficients are described. Fourthly, various implementations of a second embodiment comprising adapting the CG and the CG size used in transform coefficients coding to the coding block size is disclosed. Then, various implementations of a third embodiment comprising adapting the CG and the CG size used in transform coefficients coding to the position of the transform coefficient are disclosed. Finally, various implementations of any of the embodiments are described wherein the possible adaptive sizes of CG is pre-defined in the picture or slice header, or directly generated by using some syntaxes in the bitstream.

A decoding method comprising determining a CG mode

The present principles are advantageously implemented in an decoder in the entropy decoding module 230 of FIG. 11. FIG. 13 illustrates an exemplary decoding method 1300 according to a general aspect of at least one embodiment. In step 1301, at least one a block of an image of the video to decode is accessed, The block comprises a set of at least one quantized transform coefficients to decode.

According to an embodiment, step 1310 comprises determining a coefficient group mode. At the decoder, determining the coefficient group mode is implicit or explicit.

Thus, according to various embodiments exposed hereafter, depending on the size of the block, i.e. a number of transform coefficients comprised in the block, depending a position of a non-zero transform coefficient inside the image block the coefficient group mode is implicitly determined at the decoder. Or, according to another embodiment, depending on a decoded syntax element (specifying variant information and for instance named encode_CG, adaptive_CG_size), the coefficient group mode is explicitly determined at the decoder. In a variant, determining a coefficient group mode comprises decoding a syntax element (encode_CG) specifying whether a coefficient group significance flag is coded. In another variant, determining a coefficient group mode comprises decoding a syntax element (adaptive_CG_size) specifying whether a coefficient group significance flag is coded and a size of the coefficient group. When the coefficient group mode is decoded, its obtention in the encoder is latter on described with respect to first and second embodiment.

According to the embodiments described here, whether to code a coefficient group significance flag (named coded_sub_block_flag in HEVC) or the at least one size of the coefficient group when a coefficient group significance flag is coded are determined according to any one the embodiments described below.

For example, the size of the coefficient group is determined from the size of the image block or from a position of a transform coefficient inside the image block as described here after with respect to third and frouth embodiment in section 4 and 5. For example, the size of the coefficient group is derived from a division by a power of 2 of the size of the block.

According to another example, the CG size is based on the block size. For instance, the CG size is derived by dividing the width of the block by a power of 2 and dividing the height of the block with another power of 2.

According to another example, an arrangement of the coefficient groups of different sizes is based on a position of said at least one transform subblock in said block. For instance, larger CG size are used for the CG of the low frequency coefficients while smaller CG size are used for the CG of the high frequency coefficients.

According to another example, a scan region is determined, and the method applies to the scan region instead of the block of the image.

At step 1320, the set of transform coefficients is decoded responsive to the determined coefficient group mode. According to a variant wherein the coefficient group mode specifies whether to code a coefficient group significance flag (named coded_sub_block_flag in HEVC), an exemplary embodiment of the decoding step 1320 is described. For instance, a flag named encode_CG is determined is a step 1310 that is set to 1 if a coefficient group significance flag is coded. Then in a step 1321, the flag encode_CG is tested. If encode_GC is set to one (YES), the at one set of transform coefficients is decoded by group. Then, existing syntax and decoding process described for CG and used in common video compression standards can be re-used without necessitating any modifications. Accordingly, in a step 1322, each successive CG to decode is accessed. In this variant, the size of CG is 4×4. The skilled in the art will easily adapt to variant the size of the CG varies. Besides, the skilled in the art will understand that the step applies to the CGs in the block from the CG containing the last significant coefficient in the block to the top-left CG in the block. In a step 1323, corresponding to step 2&3 of the previously described decoding standard, the CG significance flag coded_sub_block_flag is decoded for the current 4×4 CG, more precisely the flag is parsed in the entropy decoder. The significant coefficient flag sig_coeff_flag indicating which coefficient is non-zero in the CG is also decoded. Then, in a test 1324, the non-zero coefficients sig_coeff_flag in the CG are checked. In a step 1325 corresponding to steps 4-7 of the previously described decoding standard, the non-zero coefficients in the current CG are decoded. If all the coefficients in the CG are zero, then this step 1325 is skipped. Then, in a step 1326, it is checked whether all CG blocks have been decoded. If NO more CG to decode, the decoding step 1320 ends, else if YES more CG to decode, the steps 1322, 1323, 1324 and 1326 are repeated.

If encode_GC is set to zero (NO), the at least one transform coefficients is not decoded by group. For instance, the at least one transform coefficients coefficients from the last significant coefficient in the block to the top-left coefficient in the block are decoded as described with steps 4-7 of the previously described decoding standard At step 1330, it is checked whether all blocks have been decoded. If NO more block to decode, the decoding ends at step 1340, else if YES more block to decode, the steps 1310, 1320, 1330 are repeated.

A coding method comprising determing a CG mode

The present principles are advantageously implemented in an encoder in the entropy coding module 145 of FIG. 10. FIG. 14 illustrates an exemplary encoding method 1400 according to a general aspect of at least one embodiment. In step 1401, at least one a block of an image of the video to encode is accessed. The block comprises a set of at least one quantized transform coefficients to encode.

According to an embodiment, step 1410 comprises determining a coefficient group mode. At the encoder according to various embodiments exposed hereafter, depending on the size of the block, i.e. a number of transform coefficients comprised in the block, depending on a number of non-zero transform coefficients inside the image block, depending on a position of a non-zero transform coefficient inside the image block, the coefficient group mode is determined.

According to a particular embodiment, the coefficient group mode is encoded for explicit signaling to the decoder. Accordingly variant of syntax elements is defined for signaling. In a variant, a syntax element (for instance named enable_CG), coding the coefficient group mode, specifies whether a coefficient group significance flag is coded. In another variant, a syntax element (for instance named adaptive_CG_size) specifies whether a coefficient group significance flag is coded and at least one size of the coefficient group. Variant implementations for determining and coding the coefficient group mode is latter on described with respect to first and second embodiments in section 3.

According to another particular embodiment, the coefficient group mode is implicitly signaled to the decoder, i.e the decoder determines the coefficient group mode from available information such as block size or position of the transform coefficient in the image block. Variant implementations for determining and coding the coefficient group mode is latter on described with respect to third and fourth embodiments in sections 4 and 5.

According to the embodiments described here, whether to code a coefficient group significance flag (named coded_sub_block_flag in HEVC) or the at least one size of the coefficient group when a coefficient group significance flag is coded are determined according to any one the embodiments described above for the decoder.

Besides, for example, the coefficient group mode is determined from a number of non-zero transform coefficients inside the image block.

According to a particular embodiment of coefficient group mode, determining the coefficient group mode comprises obtaining a first value; obtaining the number of non-zero transform coefficients of the image block and determining to code a coefficient group significance flag in the case where the number of non-zero transform coefficients of the image block is larger than a first value else determining not to code a coefficient group significance flag.

According to another particular embodiment of coefficient group mode, a plurality (for instance 3 as latter on detailed) first values are obtained and whether to code a coefficient group significance and the size of the coefficient group are responsive to a comparison between the number of non-zero transform coefficients of the image block and the plurality of first number.

According to a variant the first value or at least one first value is determined from the size of the image block.

At step 1420, the set of transform coefficients is coded responsive to the determined coefficient group mode. According to a variant wherein the coefficient group mode specifies whether to code a coefficient group significance flag (named coded_sub_block_flag in HEVC), an exemplary embodidment of the encoding step 1420 is described. For instance, a flag named encode_CG is determined in a step 1410 that is set to 1 if a coefficient group significance flag is coded according to the previous determination. Then in a step 1421, the flag encode_CG is tested. If encode_GC is set to one (YES), the at one set of transform coefficients is coded using coefficient groups. Then, existing syntax and decoding process described for CG and used in common video compression standards can be re-used without necessitating any modifications and is the reverse of the decoding process. Accordingly, in a step 1322, each successive CG to encode is accessed. In this variant, the size of CG is 4×4. The skilled in the art will easily adapt to the variant where the size of the CG varies. Besides, the skilled in the art will understand that the encoding step 1420 applies to the CGs in the block from the CG containing the last significant coefficient in the block to the top-left CG in the block in the scanning order. A step 1423 counts the number of non-zero coefficient in the current CG. Then at step 1424, the CG significance flag coded_sub_block_flag for the current 4×4 CG is determined and entropy coded. The significant coefficient flag sig_coeff_flag indicating which coefficient is non-zero in the CG is also coded. Then, in a test 1425, the non-zero coefficients in the CG are checked. In a step 1426, the non-zero coefficients in the current CG are coded. If all the coefficients in the CG are zero, then this step 1426 is skipped. Then, in a step 1327, it is checked whether all CG blocks have been coded. If NO more CG to code, the encoding step 1420 ends, else if YES more CG to encode remains, the steps 1422, 1423, 1424, 1425 and 1326 are repeated.

If encode_GC is set to zero (NO), the at least one transform coefficients is not coded using a coefficient group significance flag. For instance, the transform coefficients of the block from the last significant coefficient in the block to the top-left coefficient in the block are coded following a scanning order.

Optionnaly, in step 1430, the encode_GC of the block is coded and inserted in the bitstream.

At step 1440, it is checked whether all blocks in the image have been coded. If NO more block to code, the coding ends at step 1450, else if YES more block to decode, the steps 1401, 1410, 1420, 1340 are repeated.

The above presents a simplified decoding and coding method in order to provide a basic understanding of some aspects of subject matter embodiments. As such, the encoding and decoding step are not limited to the above described sub-steps. Additional features, variants and advantages of the present disclosure will be made apparent from the following detailed description of illustrative embodiments.

Adapting the CG and the CG size to the number of significant coefficients

As mentioned in video compression systems, the CG significance flags coded_sub_block_flag are set for each 4×4 CG from the CG containing the last significant coefficient in the coding block to the top-left CG in the coding block. However, if most of the transform coefficients inside the coding block are significant or in other word if the distribution of the significant coefficients is dense in CG of the coding block, it's costly to code one additional coded_sub_block_flag because the value of most flags is 1. While as implemented the previously discussed proposal, there is no coded_sub_block_flag to be signaled. However, if most of the transform coefficients inside the scan region are zeroes, it will also be very costly to code these zero coefficients.

Therefore, a first embodiment comprises adapting the CG and the CG size to the number of significant coefficients inside the coding block or the scan region.

To that end, the number of significant coefficients $NUM_{nz}$ is determined at the encoder, and then the number of significant coefficients $NUM_{nz}$ is compared with a given value $TH_{sig}$. The $TH_{sig}$ value is determined according to the coding block size (width, height), or the scan region size (SRx,SRy). Based on the comparison result, the first embodiment comprising determining and signaling one additional syntax to the decoder to indicate the usage and the size of CG.

In a first variant of the first embodiment, the flag encode_CG is set to false if the number of significant coefficients $NUM_{nz}$ is larger than the corresponding value $TH_{sig}$. Accordingly, there is no coded_sub_block_flag to be signaled, which indicates all the successive transform coefficients from the last significant coefficient inside the coding block, or all the coefficients inside the scan region will be coded. On the contrary, if the number of significant coefficients $NUM_{nz}$ is lower than or equal to the corresponding value $TH_{sig}$, the flag encode_CG is set to true, and the coded_sub_block_flag for each 4×4 CG from the CG containing the last significant coefficient, or from the last CG inside the scan region, is signaled. The overall process of the residual coding proposed by the first variant of the first embodiment is depicted by FIG. 4, the gray part is to determine signaling the CG or not.

According to another variant of the first embodiment, the value $TH_{sig}$ is determined based on the size of the coding block or the size of the scan region. One non-limiting example comprises accessing a look-up table to obtain the $TH_{sig}$ value as a function of the size, more precisely, as a function of the area, as shown in Equation 1:

$$TH_{sig} = \begin{cases} 0 & \text{if (area} \leq 16) \\ 16 & \text{if (16 < area} \leq 64) \\ 64 & \text{if (64 < area} \leq 256) \\ 256 & \text{if (256 < area)} \end{cases} \quad \text{Equation 1}$$

determine $TH_{sig}$ from the coding block area/size information where the area is (width*height) or (SRx*SRy).

According to another variant of the first embodiment, the value $TH_{sig}$ is determined based on the percentage or fraction r of the total number of transform coefficients inside the coding block or the scan region, as shown in Equation 2:

$$TH_{sig} = r*(width*height)$$

Equation 2: Determine $TH_{sig}$ with the Coding Block Area/Size Information where fraction r is fixed for all coding block size to ½, ¾ . . . as non-limiting example where fraction r is different based on the coding block size. As for the previous variant, the coding block size (width, height) can be replaced by the scan region size (SRx, SRy) in Equation 2.

According to another variant of the first embodiment, the value $TH_{sig}$ is determined by subtracting the number of transform coefficients inside one CG (16 if the CG size is 4×4) from the total number of transform coefficients inside the coding block or scan region, as shown in Equation 3:

$$TH_{sig} = (width*height) - (width_{CG}*height_{CG})$$

Equation 3: Determine $TH_{sig}$ with the Coding Block Size and the CG Size Information where as for the previous variant, the coding block size (width, height) can be replaced by the scan region size (SRx,SRy) in Equation 3.

According to another variant of the first embodiment, the flag encode_CG can also be decided according to the rate distortion search loop, as illustrated on FIG. 5.

In a second embodiment, it's similar to the first embodiment: one syntax named adaptive_CG_size is signaled to the decoder to indicate the usage and the size of CG. The difference is this additional syntax is not a flag. According to a particular variant of the embodiment, the value of adaptive_CG_size can be selected from [0, 3]. More values are compatible with the present principles.

Same as mentioned in the first embodiment, adaptive_CG_size is set to zero if the number of significant coefficients $NUM_{nz}$ is larger than a corresponding $TH_{sig}$. There is no coded_sub_block_flag to be signed. If the syntax adaptive_CG_size is not zero, coded_sub_block_flag for each CG from the CG containing the last significant coefficient, or from the last CG inside the scan region, is signaled. While the difference is the size of CG is not fixed as 4×4, but is depended on the value of adaptive_CG_size, as shown in Equation:

$$Size_{CG} = 2 << adaptive\_CG\_size$$

Equation 4: Derive Adaptive CG Size $Size_{CG}$ with the Syntax Adaptive_CG_Size Three non-zero adaptive_CG_size∈[1, 3] indicate 3 possible adaptive CG size $Size_{CG}$∈[4×4,8×8, 16×16]. The value of the adaptive_CG_size is decided by comparing the number of significant coefficients $NUM_{nz}$ to three pre-defined thresholds $TH_{sig}$, $TH_{sig\_1}$ and $TH_{sig\_2}$, as shown in Equation:

determine the value of syntax adaptive_CG_size $$adaptive\_CG\_size = \begin{cases} 0 & \text{if } (NUM_{nz} > TH_{sig}) \\ 1 & \text{if } (TH_{sig} \geq NUM_{nz} > TH_{sig\_1}) \\ 2 & \text{if } (TH_{sig\_1} \geq NUM_{nz} > TH_{sig\_2}) \\ 3 & \text{if } (TH_{sig\_2} \geq NUM_{nz}) \end{cases} \quad \text{Equation 5}$$

The overall process of the residual coding proposed by the second embodiment is illustrated on FIG. 6, the gray part is to determine the value of adaptive_CG_size.

In a variant of the second embodiment, the possible number of adaptive_CG_size value can be any integer value which can ensure the $Size_{CG}$ is no larger than the coding block size or the scan region size.

In another variant of the second embodiment, the derivation rules of $Size_{CG}$ as a function of adaptive_CG_size can be different. And $Size_{CG}$ can also be the rectangular shape to better adapt to the rectangular coding blocks.

Adapting the CG Size to the Coding Block Size

As mentioned before, 4k and 8k resolution videos are largely demanded, the number of larger coding block sizes is relatively increased, which indicates a lot of coded_sub_block_flags need to be signaled if the CG size is fixed to 4×4. Therefore, an embodiment comprises adapting CG size to the coding block size.

In a third embodiment, the adaptive size of CG (width$_{CG}$, height$_{CG}$) is derived by dividing the coding block size (width, height) with $2^m$ and $2^n$, while the minimum adaptive CG size is still 4×4, as shown in Equation 6:

width$_{CG}$=max(width>>$m$,4)

height$_{CG}$=max(height>>$n$,4)

Equation 6: Derive Adaptive CG Size with the Coding Block Size Information

The adaptive CG size is derived in the same process at the decoder, therefore no additional syntax is needed for this embodiment. FIG. 7 depicts the residual coding proposed by a variant of a third embodiment, the gray part is to derive the adaptive CG size.

In a variant, the adaptive CG size can be selected from a set of pre-defined CG sizes (square or rectangular) by using a look-up table as a function of the coding block size. One non-limiting example to design such look-up table as a function of the coding block area is shown in Equation 7:

Adaptive CG size from a set based on the area/size of the coding block $$Size_{CG} = \begin{cases} 4 \times 4 & \text{if (width} * \text{height} \leq 64) \\ 8 \times 8 & \text{if (64 < width} * \text{height} \leq 256) \\ 16 \times 16 & \text{if (256 < width} * \text{height)} \end{cases}$$ Equation 7

Another non-limiting example to design such look-up table as a function of the minimum dimension among the coding block size (width, height) is shown in Equation 8:

Adaptive CG size from a set based on the min (width, height) of the coding block $$Size_{CG} = \begin{cases} 4 \times 4 & \text{if (min(width, height)} \leq 8) \\ 8 \times 8 & \text{if (8 < min(width, height)} \leq 32) \\ 16 \times 16 & \text{if (32 < min(width, height))} \end{cases}$$ Equation 8

An example of applying adaptive CG size proposed by the third embodiment on different coding block sizes is shown on FIG. 8.

Adapting the CG size to the transform coefficient position

In the previously described embodiments, only one adaptive CG size will be determined and applied for each coding block. In other word, inside a coding block, the CG size remains constant but, the CG size may change from a coding block to another one. However, the distribution of the non-zero transform coefficients is varied from a CG to another CG even inside the same coding block. As is known, more significant coefficients are located at low frequency domain compared to high frequency domain. To further enhance the performance of using adaptive CG size, several adaptive CG sizes can be applied for different frequency domain inside one coding block.

Therefore, an embodiment comprises adapting a plurality of CG sizes inside a coding block to the positions of the transform coefficients, which are located at different frequency domains.

In a variant of the fourth embodiment, larger CG size are defined in low frequency domain, and smaller CG size (no smaller than 4×4) are defined in high frequency domain. The adaptive CG size used for low frequency domain Size$_{CG\_Lowfreq}$ can be derived by dividing the minimum dimension of the coding block size (width, height) with $2^m$, and the adaptive CG size used for high frequency domain Size$_{CG\_Highfreq}$ can be derived by Size$_{CG\_Lowfreq}$ with $2^n$ (the minimum adaptive CG size is still 4×4), as shown in Equation 9:

Size$_{CG\_Lowfreq}$=max(4,min(width,height))>>

Size$_{CG\_Highfreq}$=max(4,Size$_{CG\_Lowfreq}$>>$n$)

Equation 9: Derive Adaptive CG Sizes Size$_{CG\_Lowfreq}$ and Size$_{CG\_Highfreq}$ An example of such variant of the fourth embodiment applied to a 32×32 coding block, with Size$_{CG\_Lowfreq}$=8 and Size$_{CG\_Highfreq}$=4, is depicted on FIG. 9(a).

In another variant of the fourth embodiment, the smaller adaptive CG size (no smaller than 4×4) is applied for low frequency domain, while the larger CG size is applied in high frequency domain. An example of such variant of the fourth embodiment applied to a 32×32 coding block, with Size$_{CG\_Lowfreq}$=8 and Size$_{CG\_Highfreq}$=4, is illustrated on FIG. 9(b).

In yet another variant of the fourth embodiment, the larger adaptive CG size Size$_{CG\_Lowfreq}$ can only be used for the CG which contains the top-left DC coefficients. The remaining CGs in other frequency domains will apply the same smaller adaptive CG size Size$_{CG\_Highfreq}$.

In yet another variant of the fourth embodiment, there can be more than one pair adaptive CG sizes (Size$_{CG\_Lowfreq}$, Size$_{CG\_Highfreq}$). For example, a middle level adaptive CG size Size$_{CG\_Midfreq}$ can also be used for the larger size coding blocks.

Additional Embodiments and Information

This document describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this document can be implemented in many different forms. FIGS. 10, 11 and 12 below provide some embodiments, but other embodiments are contemplated and the discussion of FIGS. 10, 11 and 12 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

The terms HDR (high dynamic range) and SDR (standard dynamic range) are used in this disclosure. Those terms often convey specific values of dynamic range to those of ordinary skill in the art. However, additional embodiments are also intended in which a reference to HDR is understood to mean "higher dynamic range" and a reference to SDR is understood to mean "lower dynamic range". Such additional embodiments are not constrained by any specific values of dynamic range that might often be associated with the terms "high dynamic range" and "standard dynamic range".

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, the entropy coding, and/or entropy decoding modules (145, 230), of a video encoder 100 and decoder 200 as shown in FIG. 10 and FIG. 11. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example, the value for adaptive CG size [0:3], the different look up tables, considered coding block size. The specific values are for example purposes and the aspects described are not limited to these specific values.

FIG. 10 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 11 illustrates a block diagram of a video decoder 200. In the decoder 200, a bitstream is decoded by the decoder elements as described below. Video decoder 200 generally performs a decoding pass reciprocal to the encoding pass as described in FIG. 10. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 12 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, determining a coefficient group mode for decoding, by coefficient group, at least one coefficient of a set of transform coefficients of the image block; decoding the set of transform coefficients of the image block the responsive to the coefficient group mode; wherein the coefficient group mode is determined from at least one of a size of the image block, a decoded syntax element, a position of a significant transform coefficient of the image block.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, determining a coefficient group mode for coding, by coefficient group, at least one coefficient of a set of transform coefficients of the image block; encoding the set of transform coefficients of the image block the responsive to the coefficient group mode; wherein the coefficient group mode is determined from at least one of a size of the image block, a number of significant transform coefficients of the image block, a position of a significant transform coefficient of the image block.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, $encode_{CG}$, adaptive_CG_size, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one coefficient group mode of a plurality of parameters or syntax elements such as $encode_{CG}$, adaptive_CG_size. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We have described a number of embodiments. These embodiments provide, at least, for the following generalized inventions and claims, including all combinations, across various different claim categories and types:

A coding method for encoding a block of an image comprising determining a coefficient group mode for coding at least one coefficient of a set of transform coefficients of the image block;—encoding the set of transform coefficients of the image block the responsive to the coefficient group mode; wherein the coefficient group mode is determined from at least one of a size of the image block, a number of significant transform coefficients of the image block, a position of a transform coefficient of the image block;

A decoding method for decoding a block of an image comprising determining a coefficient group mode for decoding at least one coefficient of a set of transform coefficients of the image block; decoding the set of transform coefficients responsive to the coefficient group mode, wherein the coefficient group mode is determined from at least one of a size of the image block, a position of a transform coefficient of the image block, a decoded syntax element.

A coding/decoding method wherein the coefficient group mode specifies whether a coefficient group significance flag is coded, said coefficient group significance indicating that at least one coefficient is non-zero inside a coefficient group comprising at least one coefficient of the set of transform coefficients of the image block.

A coding/decoding method wherein the coefficient group mode specifies whether a coefficient group significance flag is coded, said coefficient group significance flag indicating that at least one coefficient is non-zero inside a coefficient group comprising at least one coefficient of the set of transform coefficients of the image block and specifies at least one size of the coefficient group.

A coding/decoding method wherein the coefficient group mode specifies a size of a coefficient group for coding a coefficient group significance flag, said coefficient group significance indicating that at least one coefficient is non-zero inside a coefficient group comprising at least one coefficient of the set of transform coefficients of the image block.

A coding method wherein encoding the set of transform coefficients of the image block the responsive to the coefficient group mode comprises, if the coefficient group mode specifies to code the coefficient group significant flag, determining a number of non-zero transform coefficients inside a current coefficient group of the image block; determining the coefficient group significance flag for the current coefficient group and, in case the number of non-zero transform coefficients inside a current coefficient group is not null, coding the at least one coefficient of the current coefficient group; else if the coefficient group mode specifies not to code the coefficient group significant flag, encoding the at least one transform coefficients of the image block.

A coding method wherein determining the coefficient group mode comprises obtaining a first value, obtaining the number of significant transform coefficients of the image block; wherein the coefficient group mode specifies that a coefficient group significance flag is coded in the case where the number of significant transform coefficients of the image block is larger than the first value.

A coding method wherein determining the coefficient group mode comprises obtaining at least one first value; obtaining the number of significant transform coefficients of the image block; the coefficient group mode specifying to code a coefficient group significance flag and the at least one size of the coefficient group is responsive to a comparison between the number of non-zero transform coefficients of the image block and the at least one first number of significant coefficient.

Determining the first value from the size of the image block.

Determining a scan region, and applying to coding/decoding method to the scan region instead of the block of the image.

A coding/decoding method comprising encoding/decoding the coefficient group mode A decoding method, wherein determining said the coefficient group mode comprises decoding a syntax element (encode_CG, adaptive_CG_size) specifying that a coefficient group significance flag is coded or specifying at least one size of the coefficient group.

A coding/decoding method applied for large coding block size (32×32, 64×64 . . . ).

A coding/decoding method applied for Luma component.

A coding/decoding method applied for Chroma components.

A coding/decoding method applied for Inter-coded blocks.

A coding/decoding method applied for Intra-coded blocks.

A coding/decoding method applied for some transform types.

A bitstream or signal that includes one or more of the described syntax elements, or variations thereof.

Inserting in the signaling syntax elements that enable the decoder to adapt CG in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs adaptation of CG according to any of the embodiments described.

A TV, set-top box, cell phone, tablet, or other electronic device that performs adaptation of CG according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs adaptation of CG according to any of the embodiments described.

A TV, set-top box, cell phone, tablet, or other electronic device that receives (e.g. using an antenna) a signal over the air that includes an encoded image, and performs adaptation of filter parameters according to any of the embodiments described.

Various other generalized, as well as particularized, inventions and claims are also supported and contemplated throughout this disclosure.

The invention claimed is:

1. A method comprising:
obtaining a coding block comprising a plurality of coefficient groups, wherein a coefficient group associated with the plurality of coefficient groups comprises a set of transform coefficients of the coding block;
determining whether a coefficient group significance indication for a coefficient group in the coding block is included in video data, wherein the coefficient group significance indication is configured to indicate that at least one coefficient is non-zero in the coefficient group; and
based on a determination that the coefficient group significance indication is not included in the video data, parsing a coefficient group size indication in the video data to decode the coding block, wherein the coefficient group size indication indicates a size of the coefficient group.

2. The method according to claim 1, wherein based on a determination that the coefficient group significance indication is included in the video data, parsing the coefficient group significance indication to decode the coding block.

3. A method comprising:
obtaining a coding block comprising a plurality of coefficient groups, wherein a coefficient group associated with the plurality of coefficient groups comprises a set of transform coefficients of the coding block;
determining whether to signal a coefficient group significance indication for a coefficient group in the coding block based on a number of non-zero transform coefficients in the coding block, wherein the coefficient group significance indication is configured to indicate that at least one coefficient is non-zero in the coefficient group; and
based on a determination to bypass signaling the coefficient group significance indication, including a coefficient group size indication in a video data to encode the coding block, wherein the coefficient group size indication indicates a size of the coefficient group.

4. The method according to claim 3, wherein based on a determination to signal the coefficient group significance indication, including the coefficient group significance indication in the video data.

5. The method according to claim 3, wherein the method comprises:
obtaining a threshold value;
determine whether the number of non-zero transform coefficients in the coding block is less than the obtained threshold value; and
based on a determination that the number of non-zero transform coefficients the coding block is less than the obtained threshold value, bypassing the signaling of the coefficient group significance indication in the video data and based on a determination that the number of non-zero transform coefficients in the coding block is larger than the obtained threshold value, including the coefficient group significance indication in the video data.

6. The method according to claim 3, wherein the method comprises:
obtaining at least one threshold value;
obtaining the number of non-zero transform coefficients in the coding block; and
including the coefficient group size indication in the video data, wherein the size of the coefficient group is responsive to a comparison between the number of non-zero transform coefficients in the coding block and the at least one threshold value.

7. The method according to claim 5, wherein the threshold value is obtained based on the size associated with the coding block.

8. The method according to claim 6, wherein the at least one threshold value is obtained based on the size associated with the coding block.

9. The method according to claim 3, wherein the size of the coefficient group is obtained based on at least one of the size associated with the coding block and a position of the set of transform coefficients of the coding block.

10. The method according to claim 3, wherein the method comprises:
obtaining a first rate distortion cost associated with encoding the coding block with the coefficient group significance indication;
obtaining a second rate distortion cost associated with encoding the coding block without the coefficient group significance indication; and
comparing the first rate distortion cost and the second rate distortion cost to determine whether to signal the coefficient group significance indication.

11. A device comprising:
a processor configured to:
obtain a coding block comprising a plurality of coefficient groups, wherein a coefficient group associated with the plurality of coefficient groups comprises a set of transform coefficients of the coding block;
determine whether a coefficient group significance indication for a coefficient group in the coding block is included in a video data, wherein the coefficient group significance indication is configured to indicate that at least one coefficient is non-zero in the coefficient group; and
based on a determination that the coefficient group significance indication is not included in the video data, parse a coefficient group size indication in the video data to decode the coding block, wherein the coefficient group size indication indicates a size of the coefficient group.

12. The device according to claim 11, wherein the processor is configured to:
based on a determination that the coefficient group significance indication is included in the video data, parse the coefficient group significance indication to decode the coding block.

13. A device comprising:
a processor is configured to:
obtain a coding block comprising a plurality of coefficient groups, wherein a coefficient group associated with the plurality of coefficient groups comprises a set of transform coefficients of the coding block;
determine whether to signal a coefficient group significance indication for a coefficient group in the coding block based on a number of non-zero transform coefficients in the coding block, wherein the coefficient group significance indication is configured to indicate that at least one coefficient is non-zero in the coefficient group; and
based on a determination to bypass signaling the coefficient group significance indication, include a coefficient group size indication in video data to encode the coding block, wherein the coefficient group size indication indicates a size of the coefficient group.

14. The device according to claim 13, wherein the processor is configured to:
based on a determination to signal the coefficient group significance indication, include the coefficient group significance indication in the video data.

15. The device according to claim 13, wherein the processor is further configured to:
obtain a threshold value;
determine whether the number of non-zero transform coefficients in the coding block is less than the obtained threshold value; and
based on a determination that the number of non-zero transform coefficients in the coding block is less than the obtained threshold value, bypass the signaling of the coefficient group significance indication in the video data and based on a determination that the number of non-zero transform coefficients in the coding block is larger than the obtained threshold value, include the coefficient group significance indication in the video data.

16. The device according to claim 13, wherein the processor is configured to:
- obtain at least one threshold first value;
- obtain the number of non-zero transform coefficients in the coding block; and
- include the coefficient group size indication in the video data, wherein the size of the coefficient group is responsive to a comparison between the number of non-zero transform coefficients in the coding block and the at least one threshold value.

17. The device according to claim 15, wherein the threshold first value is obtained based on the size associated with the coding block.

18. The device according to claim 16, wherein the at least one threshold value is obtained based on the size associated with the coding block.

19. The device according to claim 13, wherein the size of the coefficient group is obtained based on at least one of the size associated with the coding block and a position of the set of transform coefficients of the coding block.

20. The device according to claim 13, wherein the processor configured to:
- obtain a first rate distortion cost associated with encoding the coding block with the coefficient group significance indication;
- obtain a second rate distortion cost associated with encoding the coding block without the coefficient group significance indication; and
- compare the first rate distortion cost and the second rate distortion cost to determine whether to signal the coefficient group significance indication.

* * * * *